United States Patent
Bhatnager et al.

(10) Patent No.: US 7,093,281 B2
(45) Date of Patent: Aug. 15, 2006

(54) CASUAL ACCESS APPLICATION WITH CONTEXT SENSITIVE PIN AUTHENTICATION

(75) Inventors: Deepak Bhatnager, Burke, VA (US); David Hay, Montgomery Village, MD (US); Sunil Sheoran, Santa Clara, CA (US); Craig Jameson, Gaithersburg, MD (US)

(73) Assignee: G.E. Information Services, Inc., Gaithersburg, MD (US)

( * ) Notice: Subject to any disclaimer, the term of this patent is extended or adjusted under 35 U.S.C. 154(b) by 686 days.

(21) Appl. No.: 09/681,781

(22) Filed: Jun. 4, 2001

(65) Prior Publication Data

US 2002/0184100 A1 Dec. 5, 2002

(51) Int. Cl.
G06F 7/04 (2006.01)
G06F 7/58 (2006.01)
H04L 9/32 (2006.01)

(52) U.S. Cl. .................. 726/4; 726/5; 726/6; 713/183; 713/184; 705/26; 705/37; 705/44

(58) Field of Classification Search ................ 713/200, 713/201, 202, 169, 184, 183; 455/411; 705/72, 705/73, 75, 37, 26, 44; 726/4–6
See application file for complete search history.

(56) References Cited

U.S. PATENT DOCUMENTS 5,732,137 A * 3/1998 Aziz ......................... 713/155
6,081,789 A * 6/2000 Purcell ........................ 705/37
6,112,078 A * 8/2000 Sormunen et al. .......... 455/411
6,141,760 A * 10/2000 Abadi et al. ................ 713/202
6,151,588 A * 11/2000 Tozzoli et al. ................ 705/37
6,263,446 B1 * 7/2001 Kausik et al. .............. 713/201
6,829,595 B1 * 12/2004 Justice ......................... 705/64
2002/0099942 A1 * 7/2002 Gohl .......................... 713/169

* cited by examiner

Primary Examiner—Kim Vu
Assistant Examiner—Beemnet W Dada
(74) Attorney, Agent, or Firm—Foley & Lardner LLP

(57) ABSTRACT

A method and system for allowing access to an exchange by a casual user without compromising exchange security. The present invention allows a casual user to provide required input and complete simple business transactions without becoming a registered member of the exchange. The system knows what information to provide to or to collect from the casual user and provides him with a context sensitive personal identification number (CS-PIN) to allow access for that purpose. The method of the invention comprises: receiving a request from an external application; generating and transmitting an external message to the casual user containing information on accessing said casual access application; generating a context sensitive personal identification number upon access of the casual access application by the casual user using the information contained in the external message; storing the CS-PIN in a CS-PIN holder accessible to the casual user; and completing the request upon access by the casual user using the CS-PIN.

20 Claims, 2 Drawing Sheets

CASUAL ACCESS APPLICATION WITH CONTEXT SENSITIVE PIN AUTHENTICATION

BACKGROUND OF THE INVENTION

1. Field of the Invention

The present invention is directed to user authentication in an exchange environment. Specifically the invention is directed to a method and system for allowing access to an exchange by a casual user without compromising exchange security.

2. Description of the Related Art

It is known to have an electronic exchange configured such that various buyers and sellers of goods and/or services can come together and conduct business. In such an exchange, several applications may be running in a protected environment. To participate in the exchange and to have full access to the exchange applications one must be a registered member. Registration requires completion of a complex procedure in which a prospective member must submit a large quantity of information which then must be validated before membership is authorized. This complex procedure deters casual users from participating in the exchange and thus prevents the exchange from obtaining necessary information from such casual users. A casual user is defined as one who may not need full access to the exchange and its applications, but may only need to complete simple business transactions. For example, an organization may be a member of the exchange via the membership of its procurement employee. Under that organization's policies, the procurement employee is authorized to make purchases on behalf of the organization for under a certain amount. If the cost of a purchase is over that certain amount, it is necessary for that procurement employee to get additional authorization from his or her manager. This manager, however, may not be registered to participate in the electronic exchange or to use its applications. In order to complete the transaction, that manager's authorization is necessary. Thus, it is desirable to allow the manager to have access as a casual user for the limited purpose of providing the necessary authorization.

In addition to reducing the complexity of authorization when allowing access to casual users, it is also important to maintain the exchange's security and to avoid possible breaches. Therefore, the inventors have determined that there is a need for a simple yet secure way to provide access to casual users on an electronic exchange.

SUMMARY OF THE INVENTION

The present application describes a method of providing a casual user access to an electronic exchange via interaction with a casual access application. The method comprises: receiving a request from an external application; generating and transmitting an external message to the casual user containing information on accessing the casual access application; generating a context sensitive personal identification number (CS-PIN) upon access of the casual access application by the casual user using the information contained in the external message; storing the CS-PIN in a CS-PIN holder accessible to the casual user; and completing the request upon access by the casual user using the CS-PIN.

In addition, the present application describes a system for providing a casual user access to an electronic exchange. The system comprises: an exchange application server for running exchange applications, at least one of the applications requiring interaction with the casual user; a casual access application server connected to the exchange application server for receiving a request from and for transmitting a response to the exchange application server, for generating an external message for the casual user containing information on accessing the casual access application server, for generating a context sensitive personal identification number (CS-PIN) for the casual user and for completing the request through interaction with and upon access by the casual user; and a CS-PIN holder accessible by the casual user and connected to the casual access application server for receiving a CS-PIN from the casual access application server and providing it to the casual user.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

The present invention is now described in detail with reference to the above-mentioned figures. The present invention can be summarized as a method and system for allowing access to an exchange by a casual user without compromising exchange security. This allows a casual user to provide required input and complete simple business transactions without becoming a registered member of the exchange. The system knows what information to provide to or to collect from the casual user and provides him with a context sensitive personal identification number (CS-PIN) to allow access for that purpose and to restrict access for other purposes. The benefits derived from this invention include one or more of maintaining a secure exchange application, reducing the exchange maintenance costs, for example, in help desk employees, reducing user error by limiting the casual user's exposure to the applications, lowering operational costs, reducing the cycle times of business processes and reducing human resources costs.

Figure 1:
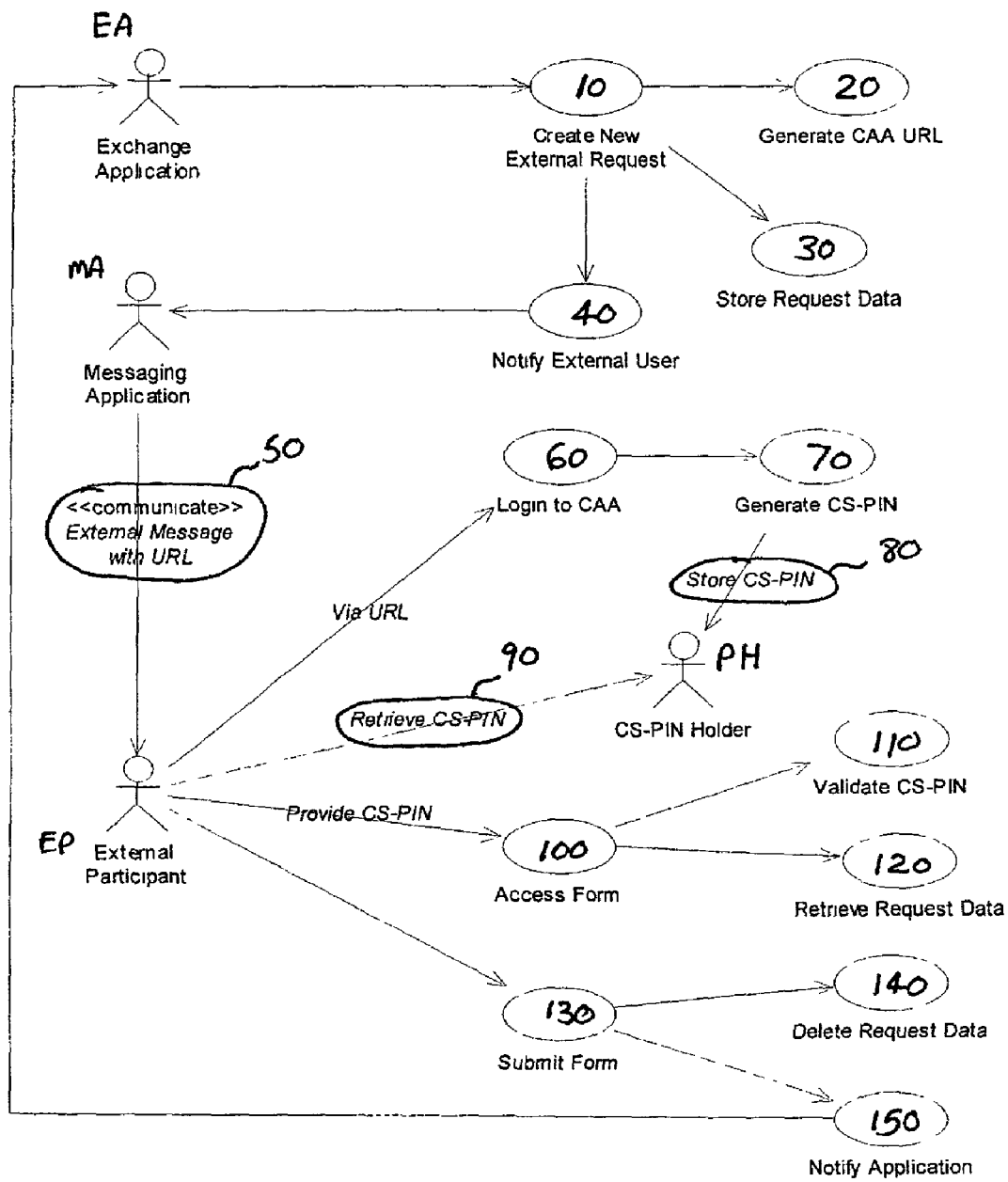
FIG. 1 is a case diagram illustrating the use of the casual access application with context sensitive PIN authentication.

FIG. 1 is a case diagram illustrating the use of the casual access application with context sensitive PIN authentication. This figure shows the method of the present invention and the interaction between the various applications and participants. In this figure the exchange application (EA) represents any application that is protected by the exchange security mechanisms and requires an external participant (EP) to access all or a subset of its features. The external participant (EP), also called a "casual user," represents any individual who is required to interact with an exchange application but is not registered with the exchange security mechanisms. Typically, the external participant would be represented by a PC, a PDA or other network or Internet device.

Starting with the upper left corner of FIG. 1, some event takes place within the exchange application wherein the application determines that some interaction with an external participant is necessary. For example, the application may need some input from the external participant, or the external participant may need to access some information from the application. Once this determination is made, a new external request is created, as shown as box 10 in FIG. 1. In this step certain information is transferred from the exchange application to a casual access application (CAA) (shown in FIG. 2 as block 250). This may be a form that is passed from the exchange application to the CAA or it may just be a request from the exchange application to the CAA to use an existing template along with information to fill out different variables within the template.

The CAA 250 receives this request and will do three things. The first, shown in box 20, is to generate a reference such as a unique URL. This reference is going to be the address that the external participant will use in order to access the CAA 250. At the same time the CAA, as shown in box 30, stores the data received from the exchange application for later reference. Once the reference is generated the external participant is notified, as shown in box 40. This notification includes the reference that was generated plus any other message that the external participant will need in order to access the CAA.

This notification is then given to a messaging application (MA) which is a mechanism for sending messages to individuals that may or may not be registered with the exchange security mechanisms. The notification is communicated as shown in box 50 by the messaging application to the external participant. In the preferred embodiment this is done via e-mail, but in the present invention can include any other form of communication. More important than the form of communication used is the fact that the notification includes the information needed for the external participant to access the CAA system, including the reference.

As shown in the figure the external participant is able to login to the CAA 250 using the reference it has received, as shown in box 60. Once he has logged in, the CAA will acknowledge his entrance into the system and inform him that a context sensitive PIN will be generated. Box 70 shows the actual generation of the CS-PIN by the CAA. Note that the actual CS-PIN is not communicated to the external participant, but rather only a notification that a CS-PIN has been generated is communicated. Also, in the preferred embodiment of the invention, the CS-PIN itself is time sensitive in that it will expire within a certain amount of time if not used or retrieved.

The CS-PIN, as shown in box 80, is sent by the CAA and is stored with a CS-PIN holder (PH). This CS-PIN holder represents a location that is well known to both the exchange and the external participant. This location is where the CS-PIN is deposited by the system in order to provide it to the external participant when requested. There are several possible implementations of the CS-PIN holder. For example, it could be an e-mail address wherein the CS-PIN itself is e-mailed to that address. It could also be a globally accessible web page wherein the CS-PIN is published. It could also be a globally accessible FTP server wherein the CS-PIN is uploaded to that server. Essentially the CS-PIN holder could be any system to which the CAA services are allowed to write data and the external participant has read permission. The CS-PIN holder could remain the same for future accesses by the external participant and could even be located with the external participant. Alternatively, the CS-PIN holder could change from access to access, thus being valid for only one transaction, thereby making the system more secure.

The external participant, once notified that a CS-PIN has been generated, can retrieve this CS-PIN, as shown in box 90, from the CS-PIN holder. As mentioned above, the CAA application does not inform the external participant of the location of the CS-PIN holder or how to access it. This information must be obtained by the external participant from the registered user or another credentialed source. Thus, the registered user is responsible for contacting the external participant to establish the location and possibly the type of the CS-PIN holder to be used. In this way no message transmitted to the external participant from the CAA system contains sufficient information to allow an unauthorized interceptor of a message to access the system. For instance, while an intercepted message may contain the generated URL or other reference to access the CAA system, such message would not contain the CS-PIN or the location of the CS-PIN holder.

Referring again to FIG. 1, once the external participant has, in box 90, retrieved the CS-PIN from the CS-PIN holder, he can then access the forms that he needs to access in order to provide the information needed by the application or to see the information he needs to see. This is shown in box 100. The CAA, in box 110, validates the CS-PIN to positively identify the external participant. The request data previously stored, is shown in box 120 as being retrieved in order to provide the external participant with the requisite information or requisite questions to answer.

After the external participant has completed what is necessary from him, he submits the form, as shown in box 130, and the CAA will log him out of the system. The request data will be removed by the CAA from the active database, as shown in box 140. The CAA will then notify the exchange application appropriately, as shown in box 150. That is, the exchange application will be provided with the necessary information obtained from the external participant or derived from that information. This may include information provided by the external participant or simply an indication that the external participant has viewed certain information or has provided authorization by electronic signature, etc.

Figure 2:
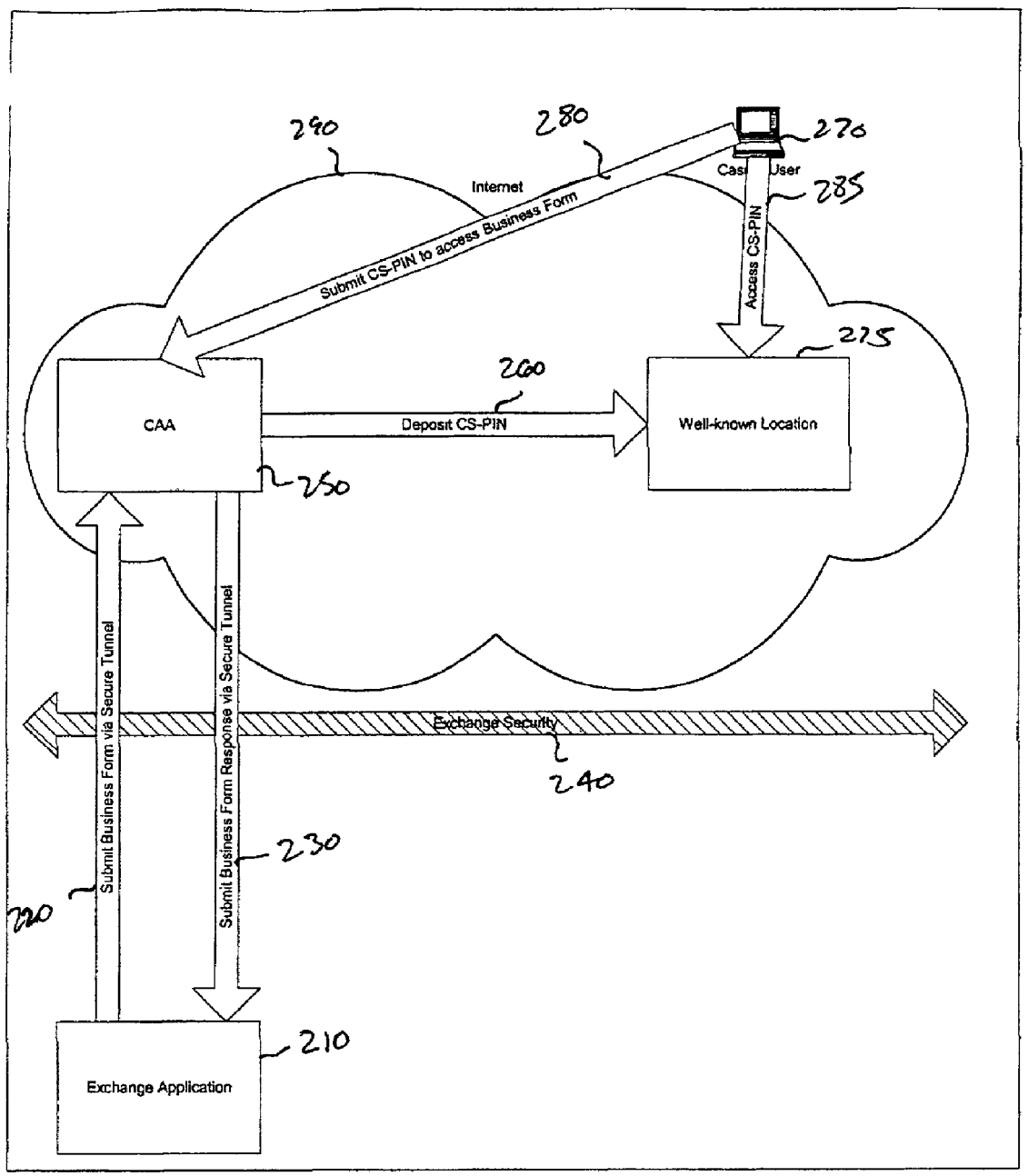
FIG. 2 illustrates a typical configuration for a casual access application in interaction with an exchange application.

FIG. 2 shows a typical configuration for a CAA server in interaction with an exchange application server. The exchange application server, shown as element 210, submits a business form via a secured tunnel, shown as 220. This form, as discussed above, could be a template, but more generally is the request for information needed from the external participant. The secured tunnel used to communicate this request to the CAA server traverses the exchange security, shown as element 240. The connection between the exchange application server 210 and the CAA server 250 could be any number of secure communication links and is preferably a direct connection. Similarly, the response ultimately provided by the CAA server 250 to the exchange application 210 is made via a secured tunnel 230, which also traverses the exchange security 240.

The CAA server 250 performs all of the functions attributed to the CAA as described above with reference to FIG. 1. The functionality of the system could be implemented in a CAA server using a single processor, multiple processors or using several processor systems that are connected over a network. It is also possible to distribute the functionality of the system over a multitude of sites which are suitably connected together using conventional networking or internetworking techniques.

As discussed above, the CAA server interacts with the casual user or external participant shown as element 270 using one or more appropriate protocols, as well as with the CS-PIN holder shown as well known location 275. The casual user 270 is represented as a computer, but could also be interacting with the system by hand held devices or other convenient devices. The CS-PIN generated by the CAA server 250 is deposited with the well known location 275 over a link 260. The characteristics of link 260 depend upon the implementation of the CS-PIN holder or well known location 275.

In addition, the casual user 270 must interact with well known location 275. This interaction is made over link 285, the characteristics of which also depend upon the implementation of well known location 275. Having obtained the CS-PIN from the well known location 275, the casual user 270 can access the requisite forms from CAA server 250. This access is made via link 280, which in the preferred embodiment is Internet based. In fact, links 260, 280 and 285 may all be Internet based, the Internet being shown in FIG. 2 as element 290.

In the preferred embodiment, the element 290 is the Internet. However, element 290 can also include a wide area network (WAN), an internet network, a public tariff telephone network or a private value added network (VAN). Alternatively, element 290 can be implemented using any combination of these different kinds of communication networks. It will be appreciated that many other similar configurations are within the abilities of one skilled in the art and all of these configurations could be used with the method of the present invention. Furthermore, it should be recognized that the computer system and network disclosed herein can be programmed and configured in a variety of different manners by one skilled in the art, to implement the method steps discussed further herein.

Thus, a method and system for allowing access to an exchange by a casual user without compromising exchange security have been described according to the present invention. Many modifications and variations may be made to the techniques and structures described and illustrated herein without departing from the spirit and scope of the invention. Accordingly, it should be understood that the methods and interfaces described herein are illustrative only and are not limiting upon the scope of the invention.

It should be noted that although the flow chart provided herein shows a specific order of method steps, it is understood that the order of these steps may differ from what is depicted. Also two or more steps may be performed concurrently or with partial concurrence. Such variation will depend on the software and hardware systems chosen in generally on designer choice. It is understood that all such variations are within the scope of the invention. Likewise, software and web implementation of the present invention could be accomplished with standard programming techniques with rule based logic and other logic to accomplish the various database searching steps, correlation steps, comparison steps and decision steps.

What is claimed is:

1. A method of providing a casual user access to an electronic exchange via interaction with a casual access application, wherein a casual user is an individual who is required to interact with an exchange application but is not registered with an exchange security mechanism, said method comprising:
    a) detecting an event within an electronic exchange application which is run in the electronic exchange wherein the electronic exchange application determines that some interaction with an external application is necessary;
    b) automatically responding to the event detection by generating and transmitting an external message to said casual user containing information on accessing said casual access application;
    c) automatically generating a context sensitive personal identification number (CS-PIN) upon access of said casual access application by said casual user using said information;
    d) storing said CS-PIN in a CS-PIN holder, wherein said CS-PIN holder is independent of said casual access application and said casual user and is accessible to said casual user; and
    e) enabling the casual user access to said casual access application by said casual user using said CS-PIN.

2. A method according to claim 1, wherein step b) further comprises storing data defining said request and wherein step e) further comprises retrieving said data defining said request in order to convey said data to said casual user.

3. A method according to claim 2, wherein step e) further comprises providing said external application with a notification of completion of said request and deleting said data defining said request.

4. A method according to claim 3, wherein said notification includes information requested by said external application from said casual user.

5. A method according to claim 1, wherein said CS-PIN becomes ineffective after elapse of a predetermined amount of time after generation.

6. A method according to claim 1, wherein said CS-PIN holder is an e-mail address accessible by both the casual access application and said casual user.

7. A method according to claim 1, wherein said CS-PIN holder is a web page accessible via the Internet by both the casual access application and said casual user.

8. A method according to claim 1, wherein said CS-PIN holder is a file transfer protocol (FTP) database accessible by both the casual access application and said casual user.

9. A computer readable medium having machine readable program code recorded thereon for execution on a computer for providing a casual user access to an electronic exchange via interaction with a casual access application, comprising program code to perform the following method steps:
    detecting an event within an electronic exchange application run in the electronic exchange wherein the electronic exchange application determines that some interaction with an external application is necessary;
    responding to the event detection by generating and transmitting an external message to said casual user containing information on accessing said casual access application;
    generating a context sensitive personal identification number (CS-PIN) upon access of said casual access application by said casual user using said information;
    storing said CS-PIN in a CS-PIN holder, wherein said CS-PIN holder is independent of said casual access application and said casual user and is accessible to said casual user; and
    enabling the casual user access to said casual access application by said casual user using said CS-PIN.

10. A computer readable medium according to claim 9, wherein said program code further comprises code for storing data defining said request and further comprises code for retrieving said data defining said request in order to convey said data to said casual user.

11. A computer readable medium according to claim 10, wherein said program code further comprises code for providing said external application with a notification of completion of said request and code for deleting said data defining said request.

12. A computer readable medium according to claim 11, wherein said notification includes any information requested by said external application from said casual user.

13. A computer readable medium according to claim 9, wherein said program code further comprises code to render said CS-PiN ineffective after elapse of a predetermined amount of time after generation.

14. A system for providing a casual user access to an electronic exchange, said system comprising:
   an exchange application server for running exchange applications, at least one of said applications requiring interaction with said casual user and detecting an event within the exchange applications which determines that some interaction with the casual user is necessary;
   a casual access application server connected to said exchange application server for receiving a request from and for transmitting a response to said exchange application server in response to the detection of the event, for generating an external message for said casual user containing information on accessing said casual access application server, for generating a context sensitive personal identification number (CS-PIN) for said casual user and for completing said request through interaction with and upon access by said casual user; and
   a CS-PIN holder accessible by said casual user and connected to said casual access application server for receiving a CS-PIN from said casual access application server and providing it to said casual user, wherein said CS-PIN holder is independent of said casual access application server and said casual user.

15. A system for providing a casual user access according to claim 14, wherein said CS-PIN holder is an e-mail address accessible by both the casual access application server and said casual user.

16. A system for providing a casual user access according to claim 14, wherein said CS-PIN holder is a web page accessible via the Internet by both the casual access application server and said casual user.

17. A system for providing a casual user access according to claim 14, wherein said CS-PIN holder is a file transfer protocol (FTP) database accessible by both the casual access application server and said casual user.

18. A system for providing a casual user access according to claim 14, wherein said casual access application server further comprises a storage area and wherein said casual access application server stores data defining said request and later retrieves said data in order to convey said data to said casual user.

19. A computer readable medium according to claim 9, wherein a casual user is an individual who is required to interact with an exchange application but is not registered with an exchange security mechanism.

20. A system for providing a casual user access according to claim 14, wherein a casual user is an individual who is required to interact with an exchange application but is not registered with an exchange security mechanism.

* * * * *